3,465,064
ADHESIVE PLASTICISED SULPHUR CONTAINING AN OLEFINE POLYMER
Jean-Baptiste Signouret, Billiere, France, assignor to Societe National des Petroles, d'Aquitaine, Courbevoie, France
No Drawing. Filed Mar. 2, 1967, Ser. No. 619,927
Claims priority, application France, Mar. 11, 1966, 53,146
Int. Cl. C08g 43/02
U.S. Cl. 260—878
15 Claims

ABSTRACT OF THE DISCLOSURE

A process is provided for the manufacture of a new plastic composition formed by heating sulphur at a temperature in the range from 100° to 200° C. with a polythiomethylene alkanol, a polyolefin having a molecular weight of 200 to 20,000 and being derived from a monoolefin having 2 to 8 carbon atoms and optionally an ethylenic hydrocarbon until a homogenous plastic composition is formed.

---

The present invention relates to a new plastic composition based on sulphur and organic compounds, and also to a process for the manufacture of this composition.

Various plastic compositions, formed by heating sulphur with certain organic compounds, particularly polythiomethylene alkanols or ethylenic hydrocarbons, are already known and are of great utility in various applications, particularly for the facing of concrete or asphalt. The present invention provides an improvement with respect to the known compositions, particularly in that it permits an excellent adhesiveness to be obtained, not only on concrete, brickwork or asphalt, but also on metals, such as for example steel, cast iron, aluminium, etc., and on glass, plastic materials and wood.

The process according to the invention consists in incorporating into the molten sulphur at the same time a polythiomethylene alkanol, an olefine polymer and optionally an ethylenic compound, and in heating the material thus obtained until there is formation of a homogeneous and plastic composition.

The mixture subjected to the heating preferably comprises 40% to 95% of elementary sulphur, the remainder being formed by the aforementioned adjuvants, disregarding the fillers, pigments, colouring agents or other similar materials which can also be added.

The polythiomethylene alkanols which can be used in carrying out the invention are themselves generally more or less resinous or waxy substances; in the remainder of the present specification, they are designated by the term "resin $R_s$." These substances are formed in known manner when a haloepoxy alkane is caused to react simultaneously with hydrogen sulphide and with an aqueous solution with a polysulphide of alkali or alkaline earth metal. The haloepoxy alkane can for example be 1-chloro-5,6-epoxy-hexane; 2-chloro-5,6-epoxyhexane; 1-chloro-4,5-epoxypentane; 1-chloro-3,4-epoxybutane; 2-bromo-3,4-epoxybutane; 1-chloro-2,4-epoxybutane; 1-chloro-2,3-epoxypropane, etc., it moreover being possible for the position of the halogen to be different from that indicated by these examples. The last of the substances referred to above, known under the name of epichlorhydrin, is a very common chemical product which is accessible economically in large quantities, and consequently it is of particular practical use for the invention. Thus, the polythiomethylene alkanol which is greatly to be recommended as additive within the scope of the new process is that which is obtained by the condensation of 1.5 to 2 mols of epichlorhydrin and at least 1 mol of $H_2S$ with 1 mol of alkali or alkaline earth polysulphide in aqueous solution, at a temperature which is between ambient temperature and 100° C.

The "$R_s$ resins" could be represented by the summary formula:

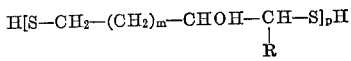

in which $m$ is in general a number from 0 to 17 and usually 0 to 3; R is a hydrogen atom or even an alkyl, of which the number of carbon atoms generally does not exceed 16 and is usually from 1 to 3. The index $p$ is at least 2 and can assume fairly high values, for example, of the order of 40; $p$ is preferably from 4 to 24.

In the particular case where the resin $R_s$ is a derivative of epichlorhydrin, it can be represented by

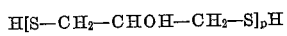

in which $p$ is 4 to 24, the molecular weight of the resin being generally about 500 to 3000.

The resins $R_s$, which are preferably used, are soluble in dioxane, tetrahydrofuran and in dimethyl formamide; they are dissolved in molten sulphur at about 150° C.

The polyolefines, incorporated into the sulphur concurrently with the resin $R_s$, are ethylenic hydrocarbon polymers and/or copolymers, such as: ethylene, propylene, butene, isobutene, pentenes, hexenes, heptenes, octenes, etc. Particularly favourable industrial results are obtained with polybutenes and polyisobutenes.

These polymers or copolymers are liquid, waxy or solid at ambient temperature. Their molecular weight, determined by measuring the viscosity, are preferably of the order of 200 to 20,000 or best of all from 400 to 11,000.

The polyolefine or polyolefines can be incorporated into the sulphur before, after or simultaneously with the addition of the resin $R_s$. The resin $R_s$ can also be mixed first of all under heat with the selected polyolefine.

There is a reaction and not a simple mixing between the olefine polymer and the sulphur. Actually, the introduction of polyolefine into the mixture of sulphur and $R_s$ is accompanied by a release of hydrogen sulphide; there is consequently dehydrogenation and subsequent reaction on the sulphur.

From what is known concerning the reactions of sulphur with the olefines, these reactions are facilitated by the presence of polysulphides or thiols. In the case of the present invention, the resin $R_s$, which is a dithiol polysulphide, facilitates the reaction between the sulphur and the olefine polymer. If an attempt is made to cause a direct reaction between the sulphur and the olefine polymer, the reaction is much longer (8 to 12 hours) and the product which is obtained does not have the plastic qualities of the plasticised sulphur obtained from the resin $R_s$. The use of the resin $R_s$ is thus necessary for the reaction with the olefine polymer and optionally a monomeric olefine.

The rheological properties of the plastic composition according to the invention can be modified, in the direction of a greater plasticity, by the addition of an ethylenic hydrocarbon to the system comprising sulphur, resin $R_s$ and polyolefine. Different ethylenic compounds can be used for this purpose, as for example: olefinic aliphatic hydrocarbons, particularly isobutene, diisobutene, triisobutene, etc.; cycloalkenes, such as cyclopentene, cyclohexene, etc.; terpenes, such as pinene, camphene, allocimene, myrcene; aralkenes, such as styrene, α-methylstyrene, chlorostyrene, indene; dienes such as allene, butadiene, isoprene, chloroprene, hexadi-1,5-ene, diallyl, dimethallyl, heptadi-1,6-ene, cyclopentadiene; other unsaturated hydrocarbons, as for example vinyl cyclopentadiene, vinyl cyclohexene; divinyl acetylene, divinyl benzene, trivinyl benzene, hexatriene, etc.

The use of styrene or direct derivatives of styrene, such as α-methylstyrene, as well as the use of olefines having 4 to 12 carbon atoms, and particularly isobutene, diisobutene and triisobutene, are of particular value in practice.

The general working procedure for obtaining the new plastic material according to the invention consists in heating at least 40 parts by weight of sulphur with 60 parts by weight of a mixture comprising the resin $R_s$, the olefine polymer as defined above and optionally the ethylenic compound.

The ratio by weight between the resin $R_s$ and the olefine polymer can be between 0.01 and 99, but preferably between 0.2 and 5.

When more than one ethylenic compound is used, its weight is from 0 to 10 parts and preferably 0.5 to 5 parts for 1 part of resin $R_s$.

Finally, the proportions of the materials used for the preparation of the plastic composition can vary between the following limits by weight:

| | Percent |
|---|---|
| Sulphur | 40–95 |
| Polythiomethylene alkanol | 0.05–59.5 |
| Olefine polymer | 0.05–59.5 |
| Ethylenic compound | 0–49.5 |

The plastic composition according to the invention can also be obtained by separate or simultaneous addition of the resin $R_s$, of the polyolefine and optionally of one or more ethylenic compounds to the molten sulphur, with subsequent heating.

On the other hand, the invention can be carried into effect with a plastic composition prepared beforehand by heating the sulphur with the resin $R_s$, in accordance with the known method, by subsequent addition of a polyolefine and optionally an ethylenic hydrocarbon, and then heating of the molten mixture obtained.

Another working method consists in modifying a resin $R_s$ by the action of an ethylenic compound, in known manner, and then using it concurrently with a polyolefine for the incorporation and heating with the molten sulphur.

It is also possible to take a sulphur composition plasticised with the resin $R_s$ and with an ethylenic compound, according to the prior art, and to dissolve one or more polyolefines in this composition, brought to the molten state.

The preparation according to the invention is effected at a temperature from 100 to 200° C., particularly between 110° and 160° C. and preferably between 140° and 150° C., at atmospheric pressure or even under pressure, if this is required because of the nature of the possibly added ethylenic compound.

The period of reaction of the elementary sulphur with the olefine polymer in the presence of the resin $R_s$, whether modified or not, varies from 1 hour to 8 hours, and preferably between 1 hour and 4 hours, depending on the percentage of the polymer.

The aforementioned conditions are respected in such a way that the plastic composition obtained is soluble in the molten sulphur, that is to say, that after heating for 1 hour at 150° C., the composition becomes homogeneous and it gives a homogeneous film after cooling.

One of the uses of the new plastic compositions according to the present invention consists in the application of traffic lines on bituminous or concrete roads. This material adheres in an exceptional manner. The traffic lines remain intact after 1 year without any flaking, despite heavy traffic. For this use, it can be employed alone or with special glass balls for increasing the reflecting power. Balls of plastic materials or of natural or synthetic rubber can also be added to the composition by being sprinkled thereon when marking the lines or strips with a special machine; in the case of natural or synthetic rubber, the rolling properties are distinctly improved, as is the coefficient of friction.

This material can also be used as a covering for buildings; it can also be employed in the preparation of paint, alone or in admixture with suitable colouring agents.

It can also be used as a covering on the ground, being poured thereon directly or with a mixture of sand or gravel, with which it forms a true cement. This material can also serve as a jointing medium giving perfect tightness.

The non-limiting examples which follow illustrate some of the methods of preparing the plastic composition and the linings or facings obtained with this composition in accordance with the invention.

Example 1 refers to a known method of preparing a resin $R_s$.

EXAMPLE 1

Preparation of a polythiomethylene alkanol (resin $R_s$)

In to a suitable reactor containing 8 kg. of water, there are added 8.4 kg. of 48% by weight sodium hydroxide solution and 1.6 kg. of powdered sulphur. The mixture is agitated by injecting gaseous hydrogen sulphide. When the quantity of $H_2S$ introduced is 2 kg., 9 kg. of epichlorhydrin are added at 85°±5° C. while stirring and continuously introducing $H_2S$ in excess. After the end of the injection of epichlorhydrin the mixture is stirred for 1 hour at 85° C. without introduction of hydrogen sulphide and thus 3.4 kg. of $H_2S$ are attached to the 4 kg. being used.

After decantation at about 75° C., washing is carried out three times with 8 kg. of cold water, followed by dehydration at 110° C. while stirring, this giving about 10 kg. of soft resin; this resin is liquid at about 80° C.; it is soluble in tetrahydrofuran, dioxane, dimethyl formamide, dimethyl sulphoxide and in molten sulphur, this latter is plasticised when it contains the resin in question. Analysis of the resin gives:

$$S=50\% \quad SH=12\%$$

EXAMPLE 2

90 kg. of sulphur are mixed at 145° C. with 5 kg. of resin $R_s$ and simultaneously there are added 5 kg. of polybutene of molecular weight 840, stirring taking place for 1 hour at 145° C. after completing the addition of $R_s$ and polybutene. After having been poured, a homogeneous composition is obtained which adheres very well to steel, glass, aluminium, concrete and bitumen.

EXAMPLE 3

83 kg. of liquid sulphur are mixed with 5 kg. of resin $R_s$ at 145° C. and with 5 kg. of polybutene of molecular weight 840 after 1 hour at 145° C. while stirring; the mixture is cooled and there are added 7 kg. of styrene at 115° C. Stirring takes place for 1 hour at 115° C. A homogeneous solution is obtained which, when cooled, gives a plastic composition which can serve for the marking of traffic lines or strips on concrete or bitumen. The lines or strips remain serviceable for use after 1 year without any flaking, despite heavy traffic.

EXAMPLE 4

The procedure of Example 3 is followed, and then there are added 1.75 kg. of mineral pigment and 0.05 kg. of organic colour agent known as "Jaune Orazol" at 145° C. The thermoplastic composition which is obtained, re-melted and poured by means of a special machine provided with a heated atomising pistol, is employed for applying traffic lines directly to bituminous and concrete surfaces. In both cases, an excellent adherence is observed and also a very good resistance to wear by pneumatic tyres. The lines or strips remain serviceable for use after 1 year, without any flaking.

EXAMPLE 5

After cooling, a thermoplastic composition identical with that of Example 2 is re-melted and applied to a concrete wall, thereby providing a protective layer having very good resistance to weather influences and also to sulphur dioxide.

EXAMPLE 6

The operations of Example 2 are repeated, but polybutene is replaced by 5 kg. of polyethylene of molecular weight 7000. The plastic composition which is obtained adheres to the same materials as in Example 2.

EXAMPLE 7

A thermoplastic composition identical with that of Example 2 is prepared and 200 kg. of sand are added. The constituents are mixed at 120° C. and poured; a ground surfacing of excellent quality is obtained.

EXAMPLE 8

10 kg. of resin $R_s$ and 10 kg. of polybutene of molecular weight 840 are caused to react simultaneously with 70 kg. of liquid sulphur at 145° C.; this product is left for 2 hours at 145° C. After cooling to 115° C., 10 kg. of styrene are added and the temperature is maintained for 1 hour at 115° C. By subsequent pouring, a very plastic and homogeneous composition is obtained which has very good adhesive power, particularly with bitumen and concrete.

EXAMPLE 9

To 82 kg. of liquid sulphur at 145° C., there are added 8 kg. of resin $R_s$ and 2 kg. of polyisobutylene of molecular weight 2000. After heating for 2 hours at 145° C., the mixture is cooled to 115° C. and 8 kg. of styrene are added. Stirring takes place for 1 hour at 115° C. After pouring, a thermoplastic composition is obtained which adheres very well to glass, bitumen, brickwork, concrete, steel and aluminium.

EXAMPLE 10

In Example 9, the polymer is replaced by 2 kg. of polyisobutylene of molecular weight 11,000. A very viscous and very adhesive mass is obtained, after having been poured on to the same materials as in Example 9.

EXAMPLE 11

Initially 8 kg. of resin $R_s$ are heated with 6 kg. of α-methyl-styrene at 120° C. for 1 hour. The resin, thus modified, is added to 83 kg. of molten sulphur at 130° C., at the same time as 3 kg. of ethylene-propylene copolymer of molecular weight 4400 and containing 55 mol percent of ethylene. The mixture is again heated while stirring for 3 hours, progressively from 130° to 150° C.

The plastic composition obtained is similar to that of Example 9.

EXAMPLE 12

In Example 2, the polybutene is replaced by 5 kg. of atactic polypropylene of molecular weight 3800. The composition obtained is similar to that of Example 2.

EXAMPLE 13

After heating for 1 hour at 145° C., in the preparation according to Example 12, the temperature is caused to fall to 120° C. and 1 kg. of chloroprene is added, after which this temperature is maintained for 1½ hours. The composition obtained is similar to that of Example 12, but more pliable.

I claim:

1. A process for the manufacture of a plastic composition based on sulphur, comprising heating 40 to 95 parts of molten sulphur at a temperature in the range from 100° to 200° C. with 0.05 to 59.5 parts of a polythiomethylene alkanol, 0.05 to 59.5 parts of a polyolefin having a molecular weight of 200 to 20,000 and being derived from a monoolefin having 2 to 8 carbon atoms and 0 to 49.5 parts of an ethylenic hydrocarbon until a homogeneous plastic composition is formed.

2. The process of claim 1 wherein the heating is accompanied by stirring.

3. The process of claim 1 wherein the polythiomethylene alkanol corresponds to the formula

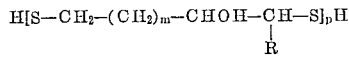

wherein $m$ is 0 to 17, $p$ is 4 to 24 and R is selected from the group consisting of a hydrogen atom and an alkyl group containing 1 to 16 carbon atoms.

4. The process of claim 3 wherein the polythiomethylene alkanol is formed from the simultaneous reaction of hydrogen sulfide and an aqueous solution of a substance selected from the class consisting of an alkali and an alkaline earth polysulphide with a haloepoxy alkane at a temperature in the range from ambient temperature to 100° C.

5. The process of claim 4 wherein the halepoxy alkane is epichlorohydrin.

6. The process of claim 5 wherein the polythiomethylene alkanol has a molecular weight of about 500 to 3,000.

7. The process of claim 6 wherein the polyolefin has a molecular weight of 400 to 11,000 and the heating is affected at a temperature in the range from 110° to 160° C.

8. The process of claim 7 wherein the polyolefin is selected from the group consisting of polybutene, polyisobutene, polyethylene, atactic polypropylene and ethylene-propylene copolymer.

9. The process of claim 7 wherein the ethylenic hydrocarbon has 4 to 12 carbon atoms.

10. The process of claim 9 wherein the ethylenic hydrocarbon is selected from the group consisting of styrene, α-methylstyrene and chloroprene.

11. The process of claim 8 wherein the ethylenic hydrocarbon is selected from the group consisting of styrene, α-methylstyrene, chlorostyrene and chloroprene.

12. The process of claim 11 wherein the ethylenic hydrocarbon is heated with the polythiomethylene alkanol before the sulphur and polyolefin are heated therewith.

13. The process of claim 11 wherein the ratio by weight between the polythiomethylene alkanol and the polyolefin is 0.2 to 5.

14. The process of claim 13 wherein the ratio by weight between the ethylenic hydrocarbon and the polythiomethylene alkanol is 0 to 10.

15. A plastic composition produced by the process of claim 1.

References Cited

UNITED STATES PATENTS 3,371,072  2/1968  Signouret et al. ------ 260—79

JOSEPH L. SCHOFER, Primary Examiner

C. A. HENDERSON, Jr., Assistant Examiner

U.S. Cl. X.R.

260—79, 79.5, 775, 879; 117—161, 148, 138.8, 122, 127, 132; 156—333, 334; 161—168, 204